(12) United States Patent
Jasmin

(10) Patent No.: US 11,652,364 B2
(45) Date of Patent: May 16, 2023

(54) POWER CONTROL DEVICE

(71) Applicant: Simon Jasmin, Montreal (CA)

(72) Inventor: Simon Jasmin, Montreal (CA)

(73) Assignee: SYSTEMEX ENERGIES INC., Laval (CA)

( * ) Notice: Subject to any disclaimer, the term of this patent is extended or adjusted under 35 U.S.C. 154(b) by 0 days.

(21) Appl. No.: 16/982,214

(22) PCT Filed: Mar. 19, 2019

(86) PCT No.: PCT/CA2019/050335
§ 371 (c)(1),
(2) Date: Sep. 18, 2020

(87) PCT Pub. No.: WO2019/178683
PCT Pub. Date: Sep. 26, 2019

(65) Prior Publication Data
US 2021/0041841 A1 Feb. 11, 2021

Related U.S. Application Data

(60) Provisional application No. 62/644,800, filed on Mar. 19, 2018.

(51) Int. Cl.
*G05B 15/02* (2006.01)
*H02J 3/14* (2006.01)
*H02J 3/24* (2006.01)
*H02J 13/00* (2006.01)

(52) U.S. Cl.
CPC ........ *H02J 13/00004* (2020.01); *G05B 15/02* (2013.01); *H02J 3/14* (2013.01); *H02J 3/241* (2020.01); *H02J 13/00001* (2020.01); *H02J 13/00002* (2020.01)

(58) Field of Classification Search
CPC ..... G05B 15/02; H02J 3/14; H02J 3/24; H02J 13/00004; H02J 2310/12; H02J 13/0006; Y04S 20/00; Y04S 20/222; Y02B 90/20; Y02B 70/3225
See application file for complete search history.

(56) References Cited

U.S. PATENT DOCUMENTS

| | | | | |
|---|---|---|---|---|
| 8,259,426 B2 * | 9/2012 | Xiao | ...................... | H02M 7/539 361/88 |
| 8,937,796 B2 * | 1/2015 | Xiao | ...................... | H02M 7/525 361/88 |
| 9,054,589 B2 * | 6/2015 | Cheng | .................. | H02M 5/4585 |
| 2010/0172161 A1 * | 7/2010 | Tallam | ................ | H02M 7/5387 363/37 |
| 2010/0172162 A1 * | 7/2010 | Tallam | .................... | H02M 1/44 363/37 |
| 2011/0241888 A1 * | 10/2011 | Lu | ....................... | F04D 15/0077 340/626 |
| 2011/0292696 A1 * | 12/2011 | Xiao | ................... | H02M 5/4585 363/37 |

(Continued)

*Primary Examiner* — Charles R Kasenge

(57) ABSTRACT

A power control device for controlling an electrical load. The system includes decision logic to implement a local response responsive to events currently occurring in a power grid. The power control device includes a user interface allowing programming the response to the grid imbalance to adapt that response to the particular application in which the load operates.

10 Claims, 10 Drawing Sheets

(56) References Cited

U.S. PATENT DOCUMENTS

| | | | | |
|---|---|---|---|---|
| 2011/0299308 A1* | 12/2011 | Cheng | .................... | H02M 1/44 |
| | | | | 363/37 |
| 2012/0271572 A1* | 10/2012 | Xiao | .................. | H02M 5/4505 |
| | | | | 702/58 |
| 2013/0057297 A1* | 3/2013 | Cheng | .................... | G01R 31/64 |
| | | | | 324/548 |
| 2013/0320762 A1* | 12/2013 | Trudel | ................ | H02J 13/0006 |
| | | | | 307/31 |
| 2016/0261116 A1* | 9/2016 | Barooah | ................ | G06Q 50/06 |
| 2018/0219377 A1* | 8/2018 | Laval | ........................ | H02J 3/38 |

* cited by examiner

POWER CONTROL DEVICE

FIELD OF THE INVENTION

The present invention relates to a controller for controlling the power consumed by a load connected to an AC supply. The invention also extends to control strategies for such load control function. In a specific and non-limiting example of implementation, the invention finds applications in electrical power grids to improve the grid frequency stability.

BACKGROUND OF THE INVENTION

To ensure the reliability of an electric power grid, the administrator must continually maintain a power reserve in order to compensate for a possible failure of energy production units and/or transmission lines. The power reserve is essentially an excess production capacity on standby. In normal conditions, the power generation units are run at less than 100% such that a degree of reserve power is always available. However, the maintenance of this reserve capacity is inefficient since the reserve constitutes a resource that cannot be effectively monetized by the utility company.

An electric power grid will operate in normal conditions at a nominal frequency (usually 50 or 60 Hz). The average frequency remains centered to this nominal value as long as the supplied power matches the power consumed by the load. Any sudden changes in generation or load resulting in an imbalance between generation and load will lead to a frequency instability during which the frequency deviates from its nominal value. Large frequency variations are undesirable because they could lead to equipment trip or even a system collapse.

Frequency instability events are generally caused by the sudden loss of a power generation unit or by the loss of a large load and are characterized by a sudden frequency variation from the frequency nominal value.

The reserve capacity in a power grid is thus tapped when the frequency drops below a certain level. To accomplish this objective, electrical generation units that supply power to the grid are equipped with a speed governor. The speed governor continuously regulates the power output of generation units in order to balance the generation with the load. Thus when the frequency of the grid varies, the speed governor responds to this variation to compensate it. For example, when the frequency is higher than normal, the speed governor will simply lower the power generated by the generation unit (therefore reducing the amount of power supplied to the grid). Alternatively, when the frequency is lower than normal, the speed governor will increase the power generation. The speed governor however has some inherent limitations. In particular, it is slow to respond since it involves certain mechanical constraints. Depending of the type of generation (hydraulic, gas, thermal, wind, etc . . . ) some time is required for the generation unit to increase its power up to the desired point.

System inertia is another aspect to frequency stability of the power grid. "Inertia" refers to the ability of the grid to buffer energy imbalances, such as excess load or excess generation and thus prevent significant and rapid frequency variations. Any power grid has a level of inherent inertia on its generation side. This inherent inertia is in the form of mechanical energy stored in the rotors of the generators. If the load on the power grid increases, the rotor inertia of a generator will be able to instantly respond to this increased load and thus dampen a frequency drop. Similarly, if the load connected to the grid is suddenly reduced, the rotor inertia will limit its tendency to overspeed, hence increase the frequency of the supply voltage.

Accordingly, it is desirable to provide improved devices and methods configured for providing support to the power grid in instances of imbalance between power generation and load, during which the frequency of the electrical energy in the power grid varies from a nominal value.

SUMMARY OF THE INVENTION

The invention provides a power control device that controls the electrical consumption of an electrical load. The power control device is responsive to a grid imbalance to regulate the electrical consumption of the load in an attempt to reduce the imbalance. The power control device includes a user interface allowing programming the response to the grid imbalance to adapt that response to the particular application in which the load operates.

The practical advantage of using a power control device with a programmable response is that it can be adapted to a wide range of applications. In other words, the power control device can be made available commercially as a generic unit and the user can program the power control device such that it behaves in way that is consistent with the application requirements. For example, there may be some applications where the load can easily tolerate a reduction of electrical consumption when a grid imbalance event occurs. A specific example is a domestic water heater. If a grid imbalance event occurs, the rate at which water is heated can be reduced without much inconvenience to the user. Yet, in other applications, the load must be maintained in a narrow operational range. In those applications, an adjustment of the electrical consumption of the load when a grid imbalance occurs is not possible.

Between these two operational extremes, there may be a range of applications in which the load has to meet different requirements and where a response to a grid imbalance may be possible but it may need to be tailored according to those requirements.

The power control device may be a stand-alone unit in which case the user interface is either on the physical device or accessible remotely such as through a connection with a computer. In that case, the user interface can be a Graphical User Interface (GUI) with controllable objects that the user can manipulate to set the operational parameters as desired. In a variant, the power control device may be in a network configuration, where it communicates with other devices. An example, is a Programmable Logic Controller (PLC) that is designed to communicate with and control a range of loads. The user interface resides at the level of the PLC, allowing customizing the response of each individual power control device to a grid imbalance event. That particular configuration is mostly suitable for industrial installations where a range of different electrical loads operate in conjunction in the context of an industrial process. In that process, it may be possible to change the electrical consumption of some particular load but not of another, which is more critical to the industrial process. The user interface at the PLC level can be used to tailor the response to a grid imbalance according to the requirements of the particular industrial process.

BRIEF DESCRIPTION OF THE DRAWINGS

A detailed description of non-limiting examples of implementation of the present disclosure is provided hereinbelow with reference to the following drawings, in which.

Figure 1:
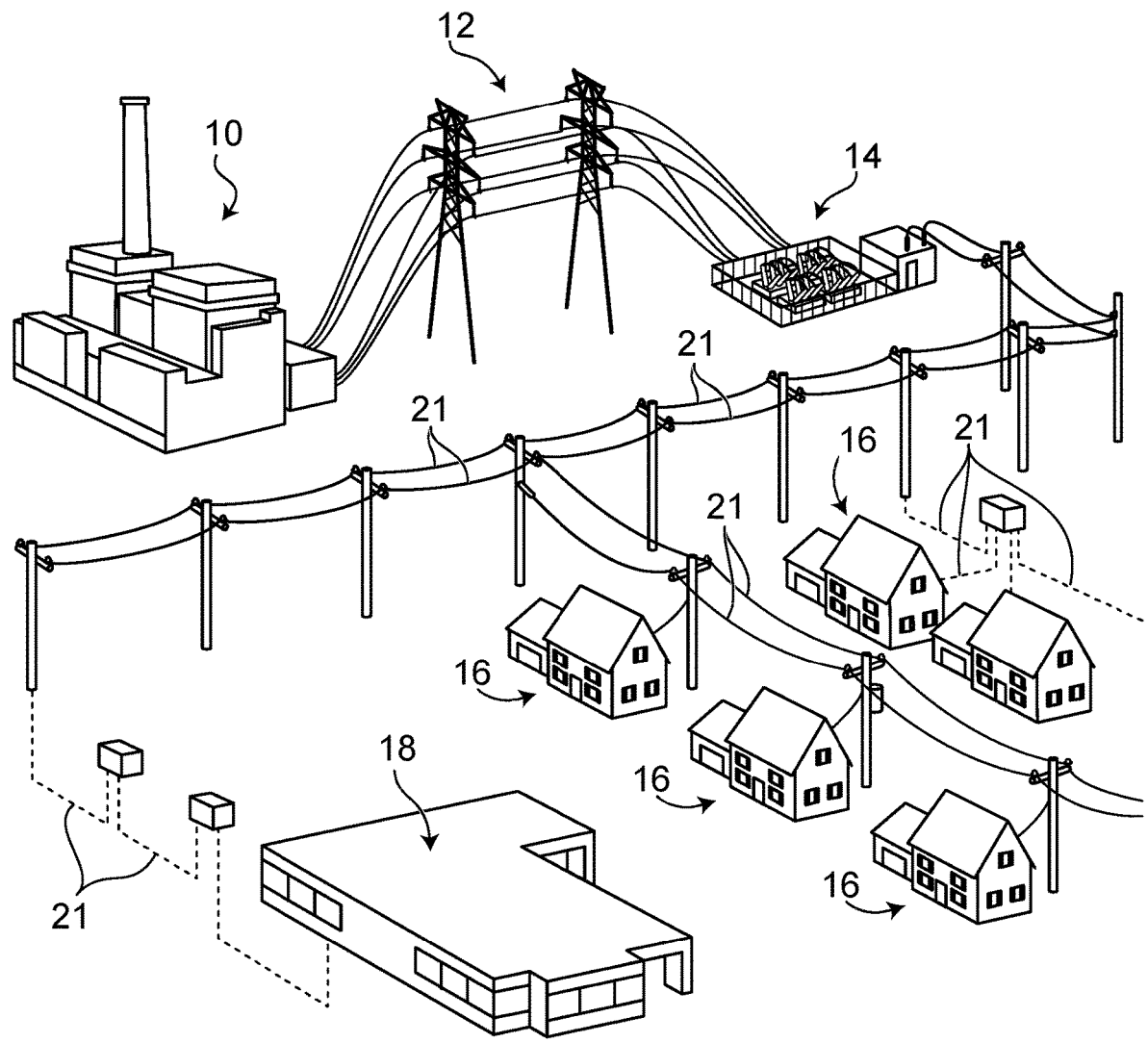
FIG. 1 shows an example of an electric power grid according to an embodiment of the disclosure and illustrating the power generation side and the distributed load side of the power grid.

In the drawings, embodiments of the disclosure are illustrated by way of example. It is to be expressly understood that the description and drawings are only for purposes of illustration and as an aid to understanding, and are not intended to be a definition of the limits of the disclosure.

DETAILED DESCRIPTION OF THE EMBODIMENTS OF THE DISCLOSURE

To facilitate the description, any reference numeral designating an element in one figure will designate the same element if used in any other figure. In describing the embodiments, specific terminology is used but the disclosure is not intended to be limited to the specific terms so selected.

Variable Frequency Drive

FIG. 1 shows an electric power grid according to an embodiment of the disclosure. Electricity is generated at a power plant 10 and is transmitted over high voltage transmission lines 12 to a voltage down step station 14. The voltage down step station 14 lowers the electrical voltage (via transformers for example) such that it may be distributed to households 16 and industrial buildings 18 via residential distribution lines 21.

The electric power grid of FIG. 1 may be "isolated" when it exhibits a limited number of connections with neighboring grids or "meshed" when it exhibits a large number of connections with neighboring grids.

Figure 2:
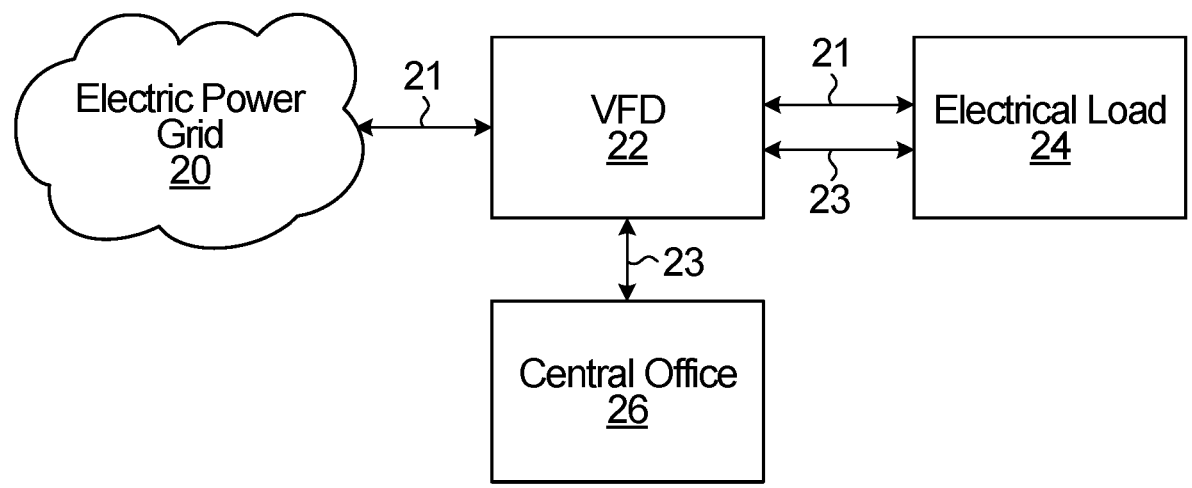
FIG. 2 is a block diagram showing a power control device such as a variable frequency drive (VFD) used to respond to a grid frequency event in the electric power grid of FIG. 1, in accordance with a non-limiting example of implementation of the disclosure.

In a non-limiting example of implementation, and with further reference to FIG. 2, there is provided a power control device 22 that may be used to provide services to the electric power grid 20. The electric power grid of FIG. 1 comprises a number of electrical loads 24, notably in the households 16 and industrial buildings 18. The electrical loads 24 and the electric power grid 20 are connected to the power control device 22 via power connection lines 21.

In a steady state mode of operation, the electric power grid 20 is characterized by a state of equilibrium between the generation side of the electric power grid 20 (i.e., power plant 10 and the likes) and the load size thereof (i.e., households 16, industrial buildings 18 and the likes).

When this state of equilibrium is lost and there is an imbalance between the generation side of the electric power grid 20 and the load side thereof, in particular when there is a generation deficit resulting from the accidental loss of a generator, the power control device 22 may be used to support the electric power grid 20 by regulating the electrical energy that the load 24 (household appliances or industrial equipment) is allowed to consume. By using a sufficient number of such power control devices 22, a significant portion of the grid load is controllable and can thus provide a significant effect on the overall power demand. Accordingly, the power control may be invoked to lower the electrical consumption of the load 24 in periods of peak demand and/or when a power generation unit fails, thus reducing the production capacity. The period of time over which the imbalance may be eliminated or reduced is largely dependent upon the extent to which the electrical consumption of the load 24 can be reduced (e.g., in % of the entire load) and the degree of imbalance between the generation side and the load side. Note that the power control device 22 can also support the electric power grid 20 in cases when there is the reverse imbalance; the generation side exceeds the load side. In those circumstances the power control device 22 can be used to increase the electrical consumption by the load 24 and therefore eliminate or reduce the imbalance.

The power control device 22 may also be connected to a central office 26 via a distinct data communication channel 23, as further described below. In the example illustrated in FIG. 2, the data communication channels 23 are physically separate from the power connection lines 21. The data communication channels 23 may be wireless or wired, such as but not limited to in the case of Internet, GSM communications and the likes. In other examples, data may also be communicated directly via the power connection lines 21, specifically via frequency encoded messages accomplished by varying a frequency of the AC supply from the electric power grid 20. An example of this approach is notably described in Canadian Patent No. 2,778,345. In this particular example, the data communication channels and the power lines share the same physical infrastructure.

In a first embodiment, the power control device 22 is a variable frequency system, specifically a Variable Frequency Drive 22 (VFD—also called a Variable Speed Drive VSD). In this embodiment, the VFD 22 modulates a speed of a motor in the load 24. To this end, the VFD 22 comprises an adjustable-speed drive configured to control a speed of an Alternating Current (AC) motor in the load 24 by varying an input frequency of the AC motor 25.

Figure 3:
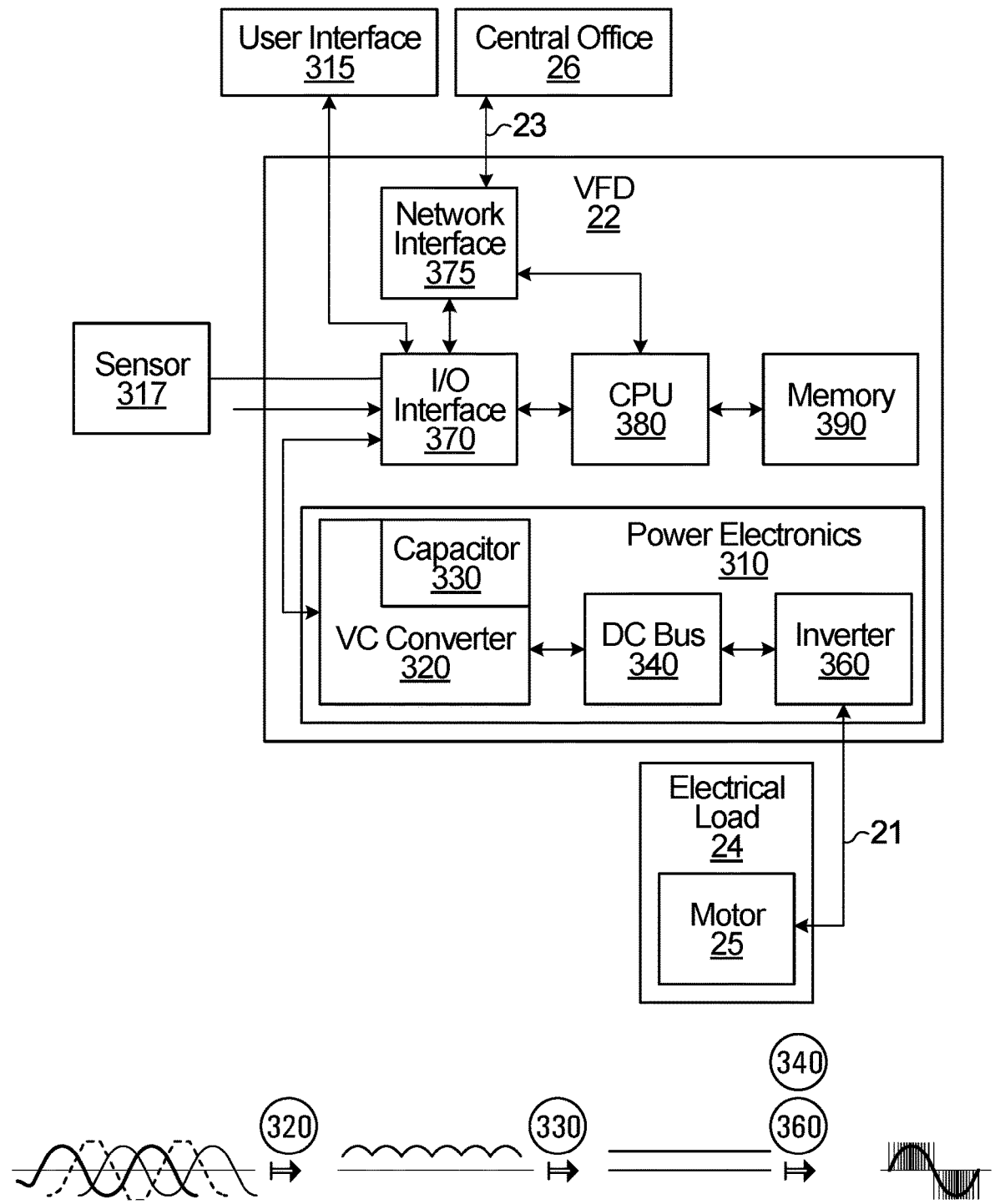
FIG. 3 is a more detailed block diagram of the VFD of FIG. 2 in accordance with a non-limiting example of implementation of the disclosure.

With further reference to FIG. 3, the VFD 22 is computer-based, including a machine-readable storage encoded with software for execution by one or more CPUs. The software defines logic, which determines how the VFD 22 operates. Specifically, the VFD 22 has an input/output (I/O) interface 370, a network interface 375, at least one CPU 380 and a machine-readable storage, or memory, 390. The VFD 22 is connected to an AC power source (such as the electric power grid 20) via a power line 21 that in normal operation provides a nominally fixed frequency (e.g., 60 Hz for most utility) input to the VFD 22. Other configurations may be possible in other embodiments. The memory 390 is encoded with the software executed by the CPU 380. Signals representative of at least one AC characteristic of the electric energy into the power grid 20, such as the frequency, are communicated to the VFD 22 via the I/O interface 370. The I/O interface 370 reads the AC characteristic, digitizes it and makes it available to the CPU 380 for processing. In one non-limiting example, if the AC frequency deviates from its nominal value, the VFD 22 reacts to reduce the power input to the motor 25 of the load 24 accordingly or, in exceptional cases, to increase it. The VFD 22 also comprises a communication protocol stored in the memory 390 that enables communication between the VFD 22 and other VFDs 22 and/or the central office 26 via the data communication channel 23. The network interface 375 connects the VFD 22 to any suitable network (e.g., TCP/IP, WiFi, ModBus, etc.).

To this end, in this non-limiting embodiment, the VFD 22 comprises power electronics 310. The power electronics 310 comprise a converter 320 that converts the AC input power to create Direct Current (DC) link power in an intermediate DC bus 340. The converter 320 may be a diode-based converter or any other suitable converter and capacitors 330 may be further used to smooth the DC signal prior to entering the DC bus 340. The intermediate DC power is then fed via the DC 340 bus to an inverter 360 which creates a variable frequency single or multi-phase AC output. The variable frequency AC output is then fed to the motor 25 of the load 24 via power line 21 and drives the motor 25 at a controlled speed and torque. Therefore, in a non-limiting example where the power line 21 provides an AC current at a 60 Hz frequency (i.e., in normal operation), the VFD 22 may feed the motor 25 of the load 24 an AC current at the frequency that provides the desirable speed of rotation of the electric motor. When it is necessary or advisable to change the speed of the motor 25, the VFD 22 alters the frequency of the AC power fed to the motor 25 by controlling the inverter 360 such that it outputs the desired frequency. It is appreciated that the motor 25 may be a three-phase motor or any other suitable motor in other embodiment.

The VFD 22 is therefore an AC-AC drive in that it converts nominally fixed frequency AC input into variable frequency AC output. The VFD 22 may be a DC-AC drive or any other suitable drive in other embodiments. VFDs such as the VFD 22 often include filter circuits at the input and/or load output, including filter capacitors.

As discussed previously, software stored in the memory 390 is executed by the CPU 380 to direct the operation of the VFD 22 via the I/O interface 370 accordingly, as further discussed below.

Response

The practical advantage of using a power control device with a programmable response is that it can be adapted to a wide range of applications. In other words, the power control device (i.e., the VFD 22) can be made available commercially as a generic unit and the user can program the VFD 22 such that it behaves in a way that is consistent with the application requirements, while still being able to contribute to the stability of the power grid. For example, there may be some applications where the electrical load 24 can easily tolerate a reduction of electrical consumption when a grid imbalance event occurs. A specific example is a domestic water heater. If a grid imbalance event occurs, the rate at which water is heated can be reduced without much inconvenience to the user. Yet, in other applications, the electrical load 24 must be maintained in a narrow operational range. In those applications, an adjustment of the electrical consumption of the electrical load 24 when a grid imbalance occurs is not possible.

Between these two operational extremes, there may be a range of applications in which the electrical load 24 has to meet different requirements and where a response to a grid imbalance may be possible but it may need to be tailored according to those requirements, as further described below.

In one non-limiting embodiment, the action implemented by the VFD 22 is autonomous, in other words it is not remotely commanded. The VFD 22 assesses locally the state of equilibrium between the generation side of the electric power grid 20 and the aggregate load and adjusts the power input to the motor 25 of the load 24 accordingly, in order reduce the imbalance, if such imbalance is detected. To this end, the VFD 22 senses a characteristic of the AC power supply, which is indicative of the degree of balance between power generation and aggregate load and determines locally what the power input to the motor 25 of the load 24 should be, in order to counteract the imbalance. The frequency of the AC power supply is indicative of the degree of balance between power generation and load. Accordingly, the VFD 22 receives at the I/O interface 370 data that conveys frequency information in order to be able to assess the degree of balance. The data that conveys the frequency information can be obtained locally, for instance it can be sensed at the power supply connections between the VFD 22 and the power grid 20. Alternatively, the frequency information can be obtained elsewhere in the power grid and communicated to the VFD 22. Objectively, deriving the frequency information remotely from the VFD 22 and communicating it to the VFD 22 is considered less desirable than sensing the frequency locally because the transmission can create a certain degree of latency, this delaying the autonomous response. However, with a fast data communication infrastructure the latency can be reduced.

Figure 4:
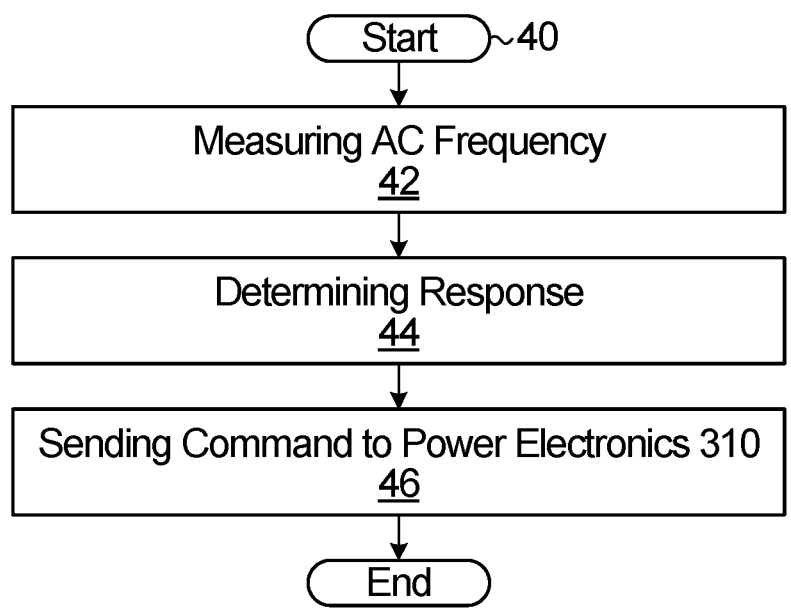
FIG. 4 is a flow chart of a process implemented by the power control device of FIG. 3 for eliminating or reducing an imbalance between the generation side and the load side of the electric power grid of FIG. 1.

With further reference to FIG. 4, a flow chart of the process implemented by the VFD 22 for controlling the power input to the motor 25 of the electrical load 24 is shown. After the VFD 22 is in an active state (generally represented by a "Start" condition at step 40), the logic of the VFD 22 proceeds to step 42 in which at least one AC characteristic of the electric energy into the power grid 20 is quantified to assess the state of equilibrium between the generation side of the electric power grid 20 and the aggregates load side thereof. In a preferred embodiment, one such AC characteristic of the electric energy is the frequency thereof. The frequency is preferably measured locally of the electrical load 24. The frequency may be measured directly at the power connection between the electrical load 24 and the electric power grid 20 or at a location that is not in the immediate vicinity of the electrical load 24 but still representative of the frequency in the grid 20. As indicated above, the frequency may also be measured remotely (i.e., non-locally or not in the immediate vicinity of the electrical load 24) and communicated to the power control device 22 via the data communication channel 23, however a response to the frequency measurement is computed locally by the VFD 22, as further discussed below.

The purpose of the frequency assessment is to detect an imbalance between the generation side of the electric power grid 20 and the load side thereof, which is reflected by a frequency deviation. Typically, the larger the frequency deviation the larger the relative imbalance is. The output of step 42 is thus a frequency value. Since the VFD 22 performs digital data processing, the frequency value is preferably generated in a digital format. Any suitable methodology may be used to convert the AC analog waveform into digital frequency information. A possible refinement is to perform several frequency measurements and to compound those measurements into a single representative value, such as by averaging them. Specifically, the VFD 22 may be programmed to acquire over a predetermined period of time a frequency measurement which is stored in the memory 390 of the VFD 22. In a specific example a frequency measurement can be made at every 100 ms interval, but this value can vary without departing from the spirit of the disclosure. Generally, the measurement interval depends on the processing speed of the CPU 380; the faster the CPU 380 and the system overall, the larger the number of frequency measurements in a given time period. The VFD 22 may also be programmed to compute a rate of frequency variation versus time, as further discussed below.

The frequency measurement may be done by computing the period of one or more consecutive cycles of the AC voltage and deriving from the period information the fundamental frequency. When the frequency is measured at each 100 ms, and assuming a 100 ms measurement window, the system measures the period of at least one AC voltage cycle within that 100 ms window.

The memory 390 of the VFD 22 may keep a certain number of frequency measurements. As a new measurement of frequency becomes available, the measurement is stored in the memory 390 and the oldest measurement overwritten. All the frequency values that are stored in the memory 390 are averaged as a new frequency measurement becomes available. The average measurement smoothes out short term frequency variations that may not be representative of the grid frequency stability, and therefore the state of balance between the generation side of the electric power grid 20 and the load side thereof. Instead of averaging the frequency measurements, other ways to blend this data into a single representative value exist without departing from the spirit of the disclosure.

Thus, the output of the processing at step 42 is a compound frequency measurement on the basis of which a response may be determined. The compound frequency measurement enables the identification of a frequency deviation, which is characteristic of an imbalance between the generation side of the electric power grid 20, and the load side thereof. The VFD 22 implements decision logic based on the compounded frequency measurement in order to determine the appropriate response at step 44.

Subsequently, the VFD 22 may send a corresponding command to the power electronics 310, including voltage converter 320, DC bus 340 and inverter 360 (via control signals, for example) as represented by step 46 to be described later.

Step 44 of the process thus uses the compounded frequency measurement as an input in determining the response required, as well as a parameter or set of parameters specified by the user, as further described below. In instances where the electric power grid 20 is stable and the frequency is within a nominal acceptable range the processing at step 44 determines that no response is necessary and no further action takes place. This processing loop repeats constantly to provide a continuous monitoring of the grid frequency stability. However when the compounded frequency reflects a degree of grid frequency instability, step 44 invokes a response.

Generally, the autonomous power regulation strategy has two main phases. The initial phase is a response to a grid frequency instability event. The purpose of this response is to adjust the power input to the motor 25 of the electrical load 24. In this specification it is referred to as "power compensation". It is advantageous to perform the power compensation as quickly as possible in order to stabilize the frequency of the AC supply. From that perspective, a fast system response, for example between 1 to 3 seconds, or even less than 1 second, is a desirable attribute. Given that the system response purports to address a quantified frequency deviation, and thereby restore the nominal frequency of the electric power grid 20, this response is called fast frequency response (FFR). The VFD 22 may implement other response times in other embodiments. Note that in most cases, the power compensation will be a power reduction since most frequency instability events are caused by a sudden loss of a power generation unit, in which case the frequency falls.

The degree of reduction of power input to the motor 25 of the electrical load 24 is related to the severity of the frequency drop. The larger the frequency drop, the more significant the power reduction will be. The specific relationship between the frequency drop and the degree of power reduction to the electrical load 24 can be linear or nonlinear. However, as further described below, other parameters may be set by the user to further refine the response of the VFD 22. As will become apparent, some parameters may be generic (i.e., applicable for any particular application) while others may be application and/or process and/or client specific, as further discussed below.

When a large number of VFDs 22 are installed in the electrical network or grid, each of them responds autonomously and independently to the under-frequency event. However, since the responses are coherent and predictable they all add up to an aggregate load reduction that has a grid-wide effect.

As described previously, operation of the VFD 22 is generally controlled by the CPU 380 via configuration software stored on the memory 390. Operation of the VFD 22 comprises user-programmable functionalities. The VFD 22 is accordingly operable by a user via a user interface 315 and programmable via the configuration software, as further described below. The user interface 315 exposes to the user a range of operational parameters that determine how the electrical load 24 operates. The user is thus able to specify for one or more of those operational parameters how they should vary when a grid imbalance arises. In this fashion, the user can tailor the response of the grid imbalance event such that the response is consistent with the application in which the electrical load 24 operates. Alternatively, in other embodiments, the VFD 22 may also be configured via a set of alphanumerical commands transmitted via a communication channel such as the data communication channel 23.

The user interface 315 may be locally or remotely accessible to the user and may comprise a set of user-activable buttons or switches or a Graphical User Interface (GUI) with a set of objects with which the user can interact. That is, the user interface 315 may be a GUI on a dedicated screen directly on the VFD 22 (i.e., a local GUI) or may also be a GUI on a computer connected to the VFD 22 (i.e., a remote GUI). Via operation of the VFD 22 and the VFD 22 configuration software, the user may edit various parameters of the VFD 22 that ultimately affect the behavior of the VFD 22, as further described below. These parameters are used to determine and further refine the response of the VFD 22 at step 44 above. The user-configurable parameters of the configuration software of the VFD 22 include but are not limited to:

- Enable or disable a response to a grid imbalance. For some applications, where no interference with the operation of the load is permissible, hence the load has to remain fully powered, that parameter is set such that even if a grid imbalance is detected, the electrical load 24 will be maintained fully powered. For less critical applications, the parameter can be set such that the electrical consumption of the electrical load 24 will be reduced. Note that this parameter can be set in a static way, in other words it does not change, or it can be set in a dynamic fashion, where it can be switched from one state to the other according to certain operational conditions. For example, in an industrial process, there may be steps or phases that are more critical than others. The software controlling the process may set the parameter to enable a response to a grid imbalance when the load performs less critical steps but disable the response when the load performs critical steps.
- The extent to which the electrical consumption of the load can be curtailed. There may be applications where a significant reduction of the electrical consumption of the load, with the attendant reduction in the load functionality is permissible without any major downside to the overall process. In contrast, there may be other scenarios, where the power control device may be used, in which, while a reduction to the electrical consumption of the load is permissible, it has to be curtailed in order to maintain a minimal level of load functionality. Therefore, the parameter can be set by the user as desired to fit the specific application requirements. As with the previous parameter, the setting does not need to be static and can be dynamic under the control of the software that manages the overall load operation. In other words, the minimal permissible load consumption can vary over time as the industrial process evolves or depending upon the state of certain sensors, time of day, etc.
- The characteristics of the grid imbalance that can trigger a reduction of the load consumption. That parameter allows specifying the conditions that will trigger a response. An example can be the degree of imbalance.
- Parameters specific to the operation of the VFD 22 and/or its related electrical load 24, such as:
  - Voltage/torque boosting;
  - Motor startup current level;
  - Frequency/motor speed;
  - Acceleration time; and
  - Acceleration ramp profile.

User-configurable parameters of the VFD 22 configuration software comprise generic parameters and application-specific parameters. Generic parameters relate to parameters inherent to the VFD 22 and the related motor 25, such as the startup current, frequency, acceleration time and acceleration ramp profile and the likes of the VFD 22, as further described below. Application-specific parameters relate to parameters extraneous to the VFD 22 and the related motor 25, such as parameters related to the temperature, humidity and the likes of a given process/application controlled by the VFD 22.

Figure 5:
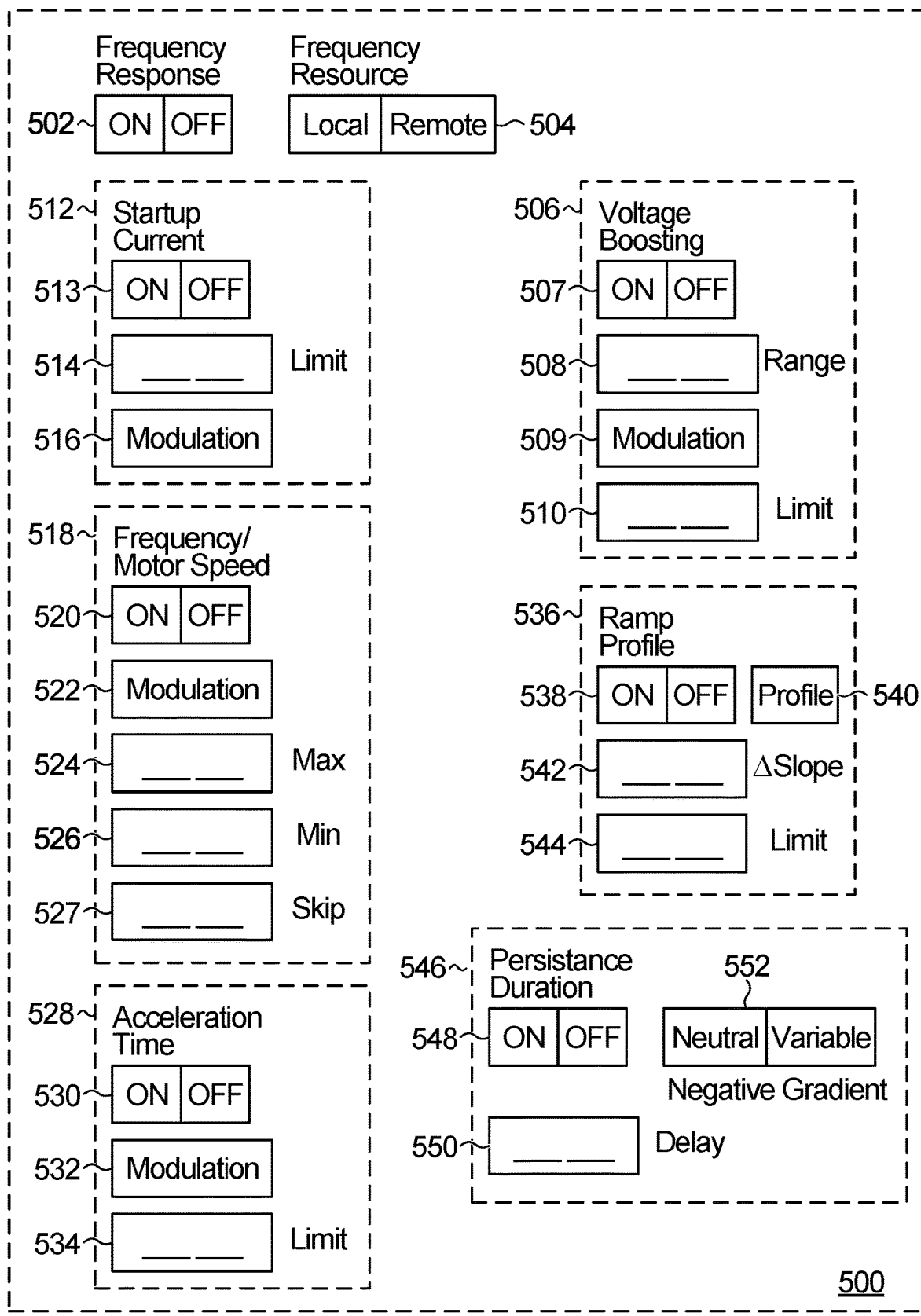
FIG. 5 is an exemplary Graphical User Interface (GUI) for operating a configuration software of the VFD of FIG. 3.

With further reference to FIG. 5, a non-limiting example of a GUI 500 on the user interface 315 is shown. The GUI 500 enables a user to configure the VFD 22, as further described below. It is appreciated that the GUI 500 may have any other suitable configuration in other non-limiting embodiments.

Enabled/Disabled

In this non-limiting embodiment, the GUI 500 has an enabled/disabled input object 502 via which the user may specify whether the VFD 22 is responsive or not to a grid imbalance event and, accordingly, whether the VFD 22 will modulate the electrical consumption of the motor 25 in response to the imbalance event.

When set to OFF, the VFD 22 will operate according to a set of predefined/predetermined parameters which are not modulated in response to a grid frequency event. In other words, when a grid imbalance is detected, such as a power generation deficit, the VFD 22 will maintain the electrical consumption of the motor 25 unchanged. In contrast, when set to ON, the VFD 22 will respond to grid imbalance event, the response being determined by a set of user-selectable parameters, as further described below. It is appreciated that the GUI objects described below may be present on the GUI, although in an inactive state, when the enabled/disabled input object 502 is set to OFF. Alternatively, the GUI objects described below may be displayed on the GUI 500 only when the enabled/disabled input object 502 is set to ON by the user.

Source of Frequency Command

In this non-limiting embodiment, the GUI 500 also has a frequency source selection object 504 via which may be toggled by the user between local/remote states to specify whether the VFD 22 is responsive to a frequency measured locally, as discussed above, or remotely, namely whether the VFD 22 is responsive to a signal sent by the central office 26.

When set to LOCAL, the VFD 22 will look for a frequency information input produced locally, i.e. at the power supply connections between the VFD 22 and the power grid 20. When set to REMOTE, the VFD 22 will disregard the local input and look for frequency information that is generated remotely. When the GUI is set to the remote state, additional settings may be made available to the user to specify where the remote source of the frequency is to be found. For instance, if the VFD 22 is networked to other VFDs or to an entity that acts as a controller for multiple VFDs, the user may be provided with a list of the nodes in the network and then be able to select the node that will be the source of the frequency information.

Note that even the VFD 22 can be configured to respond to a grid imbalance event but as a slave controller operating under the authority of a master controller that can be local or located remotely. In that variant, the master controller will determine on the behalf of the VFD 22, what the VFD response should be and sends control signals to the VDF 22 so that the VFD 22 implements the response.

Programmable regions 506, 512, 518, 528, and 536 enable the user to set parameters customizing the response to a grid imbalance event. By allowing customizing the response, the VFD 22 can be sold commercially as a generic piece of equipment that can be tailored for different applications where the requirements are different from one another. For instance, in some applications the speed of the electric motor needs to be maintained at all times above a predetermined minimal value. The VFD 22 can then be programmed to respond to a grid imbalance event by taking this requirement into account, in other words, the VFD 22 will reduce the electrical consumption of the motor but will it will control it such that the speed of rotation does not drop below the critical value.

The various parameters are described below. Note that these parameters are examples and other parameters can be changed without departing from the spirit of the disclosure.

Torque/Voltage Boosting

In this non-limiting embodiment, the GUI 500 has a torque/voltage boosting programmable setting 506 to determine if the voltage boosting function will be affected during a response to a grid imbalance event. For reference, the voltage boosting function of a VFD allows to increase the voltage applied to the motor 25 to facilitate startup or in some other instances, such as to compensate the torque decrease in low speed for a stator winding resistance of the motor 25. The VFD 22 modulates the voltage which in turns modulates the torque of the motor 25.

Via an ON/OFF object 507, the user may specify whether the voltage/torque boosting function is affected by the response to a grid imbalance event. When set to OFF, the VFD 22 will not alter the programmed voltage boosting function during the grid imbalance. In other words, if motor 25 is in an operational state where voltage boosting is necessary, that voltage boosting will be provided. When set to ON, the VFD 22 will adjust the voltage/torque boosting of the VFD 22 in response to a grid frequency event according to the specified settings.

When set to the ON position, using the programmable region 506, the user can set the boundaries of an operational window in which the voltage/torque boosting function can vary in response to a grid imbalance event. Specifically, the settings allow the user to establish limits to such variation, such that a minimal level of voltage/torque boosting would still be available to motor 25 for the intended application. More particularly, the settings include:

1) Limit—a setting allowing the user to establish a lower boundary of the voltage/torque boosting that will still be available to the motor 25 even when a grid imbalance is present via a Limit object 510. The limit can be expressed as a percentage of the voltage/torque boosting maximal value that the VFD 22 is programmed to provide or in terms of voltage value. While the user may manually enter any value, other suitable configurations are possible in other embodiments (selecting among a list of pre-defined values, etc.).

2) Modulation—that setting allows the user to determine how the voltage/torque boosting will be altered based on the particulars of the grid imbalance via a Modulation object 509. Non-limiting examples of settings include:
   a. Linear response—the voltage/torque boosting varies linearly with respect to the degree of grid imbalance.
   b. Non-linear response—the voltage/torque boosting varies non-linearly with respect to the degree of grid imbalance.
   c. Binary response—under that setting, the voltage/torque boosting either does not change when a grid imbalance occurs (which would be the equivalent of putting the object 507 in the OFF setting, or reducing the voltage/boosting to zero (negating it completely)) as long as there is a grid imbalance in effect, subject to any limit settings. If a limit setting has been specified, the voltage/torque boosting will be reduced to that limit during the entire duration of the grid imbalance event.
   d. Deadband—defines the allowable frequency excursion window outside of which a grid imbalance event is declared. In a variant, the deadband setting can be a global setting, in other words the same deadband definition is used for each controllable parameter of the response of the VFD 22 to a grid imbalance. Objectively, an independent deadband setting for each controllable parameter makes the programming of the VFD 22 more cumbersome, but allows a finer degree of granularity.

3) Range—under that setting, the user may define and/or modify the range of voltage/torque boosting modulation on the basis of the magnitude of the grid frequency event (i.e., the degree of frequency deviation) via a Range object 508. In a non-limiting example where the maximum range of voltage boost to the motor 25 is 20V, this range will be decreased (or increased) according to the measured frequency deviation. While in the embodiment of FIG. 5 the user may manually enter any numerical value, other suitable configurations are possible in other embodiments (selecting among a list of pre-defined values, defining the modification of the range in terms of %, etc.).

In some non-limiting embodiments, instead of specifying various limit, modulation and range settings, the user may also be prompted to specify a particular process/application being controlled by the VFD 22. In this embodiment, the VFD 22 stores a plurality of sets of operational settings in the memory 390 that are each associated with a particular process/application being controlled by the VFD 22. It is appreciated that this simplifies the operation of the VFD 22 which is pre-configured for a variety of processes/applications that the user can choose from via the GUI 500.

Other suitable configurations of the torque/voltage boosting programmable region 506 are possible in other embodiments.

Figure 6:
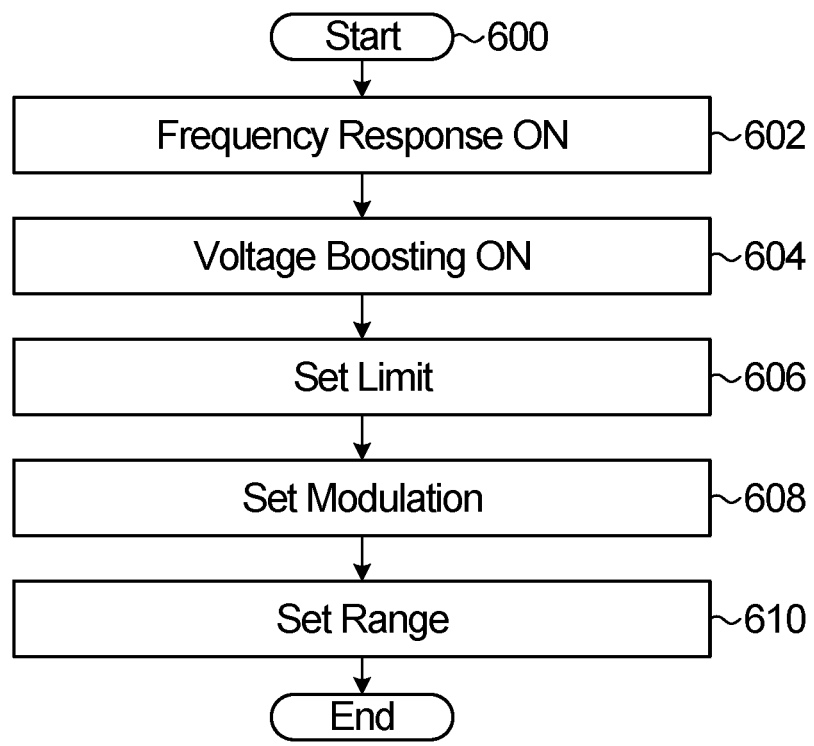
FIG. 6 is a flow chart of a process for entering voltage boosting settings in accordance with a non-limiting example of implementation of the disclosure.

With further reference to FIG. 6, a flow chart of a non-limiting process for entering the voltage boosting settings is shown. After the VFD 22 is in an active state (generally represented by a "Start" condition at step 600), the user enables the frequency response at step 602 before enabling the voltage boosting at step 604. The user then sets the limit at step 606, the modulation at step 608 and the range at step 610.

Motor Startup Current Level

In this non-limiting embodiment, the GUI 500 also has a startup current level programmable region 512 to determine if the startup current level of the motor 25 will be affected during a response to a grid imbalance event. For reference, the current startup level function may generally be implemented by the VFD 22 to prevent any damage of the motor 25 given that the highest current occurs during the start of the motor.

Specifically, via an ON/OFF object 513, the user may specify whether the startup current level function is affected by the response to a grid imbalance event. When set to OFF, the VFD 22 will not alter the programmed startup current level during the grid imbalance. In other words, if motor 25 is in an operational state where a predetermined startup current level is necessary, the same startup current level will be provided. When set to ON, the VFD 22 will adjust the startup current level of the motor 25 in response to a grid frequency event according to the specified settings.

When set to the ON position, using the programmable region 512, the user may set the boundaries of an operational window in which the startup current level function can vary in response to a grid imbalance event. Specifically, the settings allow the user to establish limits to such variation, such that a minimal level of startup current would still be available to motor 25 for the intended application. More particularly, the settings include:

1) Limit—a setting allowing the user to establish a lower boundary of the startup current level that will still be available to the motor 25 even when a grid imbalance is present via a Limit object 514. The limit can be expressed as a percentage of the maximal value of the startup current level that the VFD 22 is programmed to provide or in terms of voltage value. While the user may manually enter any value, other suitable configurations are possible in other embodiments (selecting among a list of pre-defined values, etc.).

2) Modulation—that setting allows the user to determine how the startup current level will be altered based on the particulars of the grid imbalance via a Modulation object 516. Non-limiting examples of settings include:
   a. Linear response—the startup current level varies linearly with respect to the degree of grid imbalance.
   b. Non-linear response—the startup current level varies non-linearly with respect to the degree of grid imbalance.
   c. Binary response—under that setting, the startup current level either does not change when a grid imbalance occurs (which would be the equivalent of putting the object 513 in the OFF setting, or reducing the startup current level to zero (negating it completely) as long as there is a grid imbalance in effect, subject to any limit settings. If a limit setting has been specified, the startup current level will be reduced to that limit during the entire duration of the grid imbalance event.
   d. Deadband—defines the allowable frequency excursion window outside of which a grid imbalance event is declared. In a variant, the deadband setting can be a global setting, in other words the same deadband definition is used for each controllable parameter of the response of the VFD 22 to a grid imbalance. Objectively, an independent deadband setting for each controllable parameter makes the programming of the VFD 22 more cumbersome, but allows a finer degree of granularity.

Other suitable configurations of the startup current level programmable region 512 are possible in other embodiments.

Figure 7:
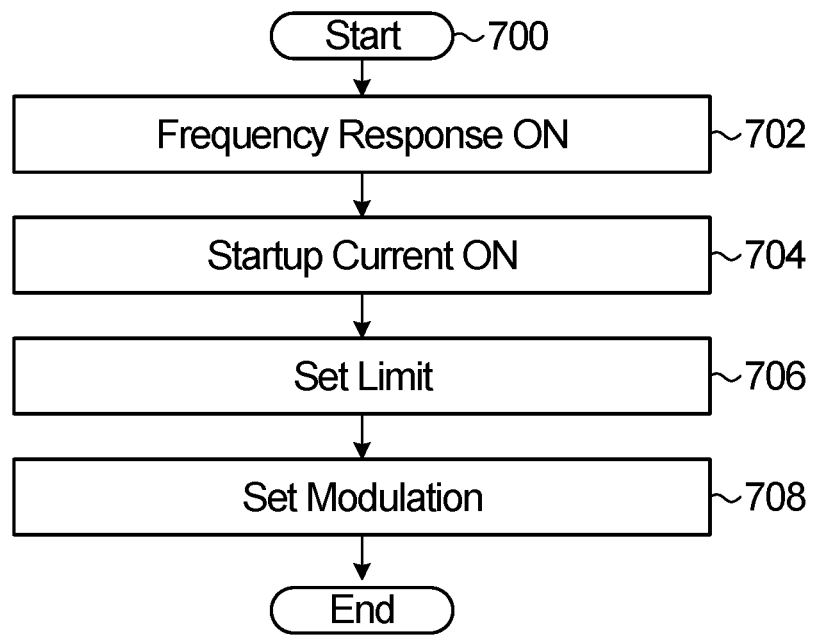
FIG. 7 is a flow chart of a process for entering startup current settings in accordance with a non-limiting example of implementation of the disclosure.

With further reference to FIG. 7, a flow chart of a non-limiting process for entering the startup current settings is shown. After the VFD 22 is in an active state (generally represented by a "Start" condition at step 700), the user enables the frequency response at step 702 before enabling the startup current function at step 704. The user then sets the limit at step 706 and the modulation at step 708.

Minimum and Maximum Frequency/Motor Speed

In this non-limiting embodiment, the GUI 500 also has a frequency/motor speed programmable region 518 to determine if the minimum and maximum frequency/motor speed of the motor 25 will be affected during a response to a grid imbalance event. It is appreciated that the speed of the motor 25 determines how much electrical energy is being consumed so, in one non-limiting example, by reducing the speed of the motor 25, the electrical consumption can be reduced to respond to a power generation deficit in the network. In practice, the motor 25 may require a minimum motor speed to operate for a given application, even during the occurrence of a power generation deficit, and the user may set this lower threshold (either as a motor speed or frequency value).

In some non-limiting examples, a reduction of the speed of the motor 25 may not affect an industrial process but there are others where a strict speed control is necessary. As with the other parameters of the VFD 22, the configuration software and notably the frequency/motor speed programmable region 518 further enables the user to tailor the response of the VFD 22 to power generation deficit events in a way to avoid a major downside on the industrial process in which the motor 25 is involved. For example, if the electric motor drives a pump that displaces liquid from a large tank, it may be possible without any major drawback to reduce the pump speed for a few minutes and even more in order to reduce the electrical consumption of the electric motor. However, there are other applications, where a strict speed control is necessary and that cannot tolerate speed variations, even during a power generation deficit. The configuration software allows tailoring the response of the VFD 22 to a power generation deficit event so as to still maintain the compatibility with the VFD 22 with the application. The user has the ability to decide if the VFD 22 will participate to the aggregate load response and the extent of that participation if a power generation deficit arises.

Via an ON/OFF object 520, the user may specify whether the minimum and maximum frequency/motor speed function is affected by the response to a grid imbalance event. When set to OFF, the VFD 22 will not alter the programmed minimum and maximum frequency/motor speed during the grid imbalance. When set to ON, the VFD 22 will adjust the minimum and maximum frequency/motor speed of the motor 25 in response to a grid frequency event according to the specified settings.

When set to the ON position, using the programmable region 518, the user may set the boundaries of an operational window in which the minimum and maximum frequency/motor speed function can vary in response to a grid imbalance event. Specifically, the settings allow the user to establish limits to such variation, such that minimal and maximal levels of frequency/motor speed are available to the motor 25 for the intended application. More particularly, the settings include:

1) Max and Min—settings allowing the user to establish lower and higher boundaries of the frequency/motor speed of the motor 25 when a grid imbalance is present via Max and Min objects 524, 526. The limits can be expressed as a percentage of the maximal and minimal values that the VFD 22 is programmed to provide or in terms of voltage value. While the user may manually enter any value, other suitable configurations are possible in other embodiments (selecting among a list of pre-defined values, etc.). In yet further embodiments, the Max and Min objects 524, 526 may enable the user to specify operational thresholds of the motor 25 in terms of units specific to a process/application controlled by the VFD 22. It is appreciated that, in this embodiment, the VFD 22 is connected to a sensor 317 via the I/O interface 370 such that the appropriate unit may be measured and considered by the CPU 380 in establishing the response of the VFD 22. In some non-limiting examples, the user may specify:
   a. For a circulation fan: a maximum and minimum rotation per minute (in RPM), a maximum and minimum rotation per minute reduction (in RPM);
   b. For a circulation pump: a maximum and minimum flow (in $m^3/s$) or pressure (in Pa), a maximum and minimum flow increase or decrease (in in m³/s or %) and pressure increase or decrease (in Pa or %);

c. For lightning equipment: a maximum and minimum luminosity (in Lux), a maximum and minimum luminosity reduction (in Lux or %);

d. For a cooling system: a maximum and minimum temperature (in ° C.), a maximum and minimum temperature reduction (in ° C. or %);

e. For a heating system: a maximum and minimum temperature (in ° C.), a maximum and minimum temperature increase (in ° C. or %); and f. For a humidifier/dehumidifier: a maximum and minimum relative humidity level (in %), a maximum and minimum increase or decrease of relative humidity (in %).

2) Modulation—that setting allows the user to determine how the minimum and maximum frequency/motor speed will be altered based on the particulars of the grid imbalance via a Modulation object 522. Non-limiting examples of settings include:

a. Linear response—the minimum and maximum frequency/motor speed vary linearly with respect to the degree of grid imbalance.

b. Non-linear response—the minimum and maximum frequency/motor speed vary non-linearly with respect to the degree of grid imbalance.

c. Binary response—under that setting, the minimum and maximum frequency/motor speed either do not change when a grid imbalance occurs (which would be the equivalent of putting the object 520 in the OFF setting) as long as there is a grid imbalance in effect.

d. Deadband—defines the allowable frequency excursion window outside of which a grid imbalance event is declared. In a variant, the deadband setting can be a global setting, in other words the same deadband definition is used for each controllable parameter of the response of the VFD 22 to a grid imbalance. Objectively, an independent deadband setting for each controllable parameter makes the programming of the VFD 22 more cumbersome, but allows a finer degree of granularity.

3) Skip—setting allowing the user to specify certain frequencies that the VFD 22 should avoid supplying to the motor 25. For example, there are instances where certain frequencies may create undesirable phenomena such as a resonance or vibrations either in the motor 25 or the equipment (i.e., the electric load 24) that the motor 25 drives. Via a Skip object 527 the user can program the VFD 22 such that it does not output specific frequencies deemed undesirable. So, as the output frequency of the VFD 22 varies to vary the speed of the motor 25, for example in response to a grid frequency event as described above, the VFD 22 will jump over anyone of those undesirable frequencies. That particular skip frequency characteristic can be respected when the speed of the motor 25 is reduced in the case of a power generation deficit. In other words, as the speed of the motor 25 is dialed back, the output frequency of the VFD 22 is selected to avoid anyone of the undesirable levels specified by the user.

In some embodiments, the configuration software may present the user via the GUI 500 user-editable and/or user-selectable parameters that are specifically tailored for a given application or a given client. That is, the GUI 500 may be adapted to the given application or client by presenting to the user only parameters relevant for the particular application (e.g., in some applications the startup current function or the voltage boosting function may not be required and/or implementable) or by modifying relevant input objects as the ones described in connection with the GUI 500 to enable the user to input parameters relevant to the particular application (e.g., a temperature range or limit, a flow range or limit, etc.).

Other suitable configurations of the frequency/motor speed programmable region 518 are possible in other embodiments.

Figure 8:
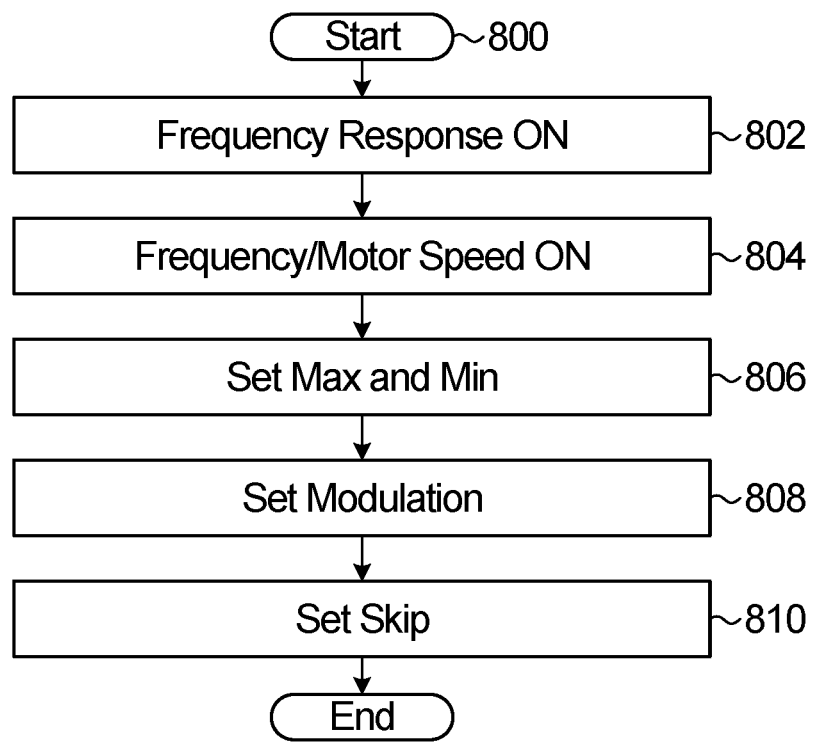
FIG. 8 is a flow chart of a process for entering minimum and maximum frequency/motor speed settings in accordance with a non-limiting example of implementation of the disclosure.

With further reference to FIG. 8, a flow chart of a non-limiting process for entering the minimum and maximum frequency/motor speed settings is shown. After the VFD 22 is in an active state (generally represented by a "Start" condition at step 800), the user enables the frequency response at step 802 before enabling the minimum and maximum frequency/motor speed function at step 804. The user then sets the minimum and maximum at step 806, the modulation at step 808 and the skip setting at step 810.

Acceleration Time

In this non-limiting embodiment, the GUI 500 also has an acceleration time programmable region 528 to determine if the acceleration time of the VFD 22 will be affected during a response to a grid imbalance event. The acceleration time is the time required for the motor to reach a predetermined speed. In one non-limiting example, the acceleration time will be reduced in response to a power generation deficit by comparison to a value of the acceleration time enforced when there is no power generation deficit.

Via an ON/OFF object 530, the user may specify whether the acceleration time of the VFD 22 is affected by the response to a grid imbalance event. When set to OFF, the VFD 22 will not alter the acceleration time during the grid imbalance. When set to ON, the VFD 22 will adjust the acceleration time in response to a grid frequency event according to the specified settings.

When set to the ON position, using the programmable region 512, the user may set the boundaries of an operational window in which the startup current level function can vary in response to a grid imbalance event. Specifically, the settings allow the user to establish limits to such variation, such that a minimal level of startup current would still be available to motor 25 for the intended application. More particularly, the settings include:

1) Limit—a setting allowing the user to establish a lower boundary of the acceleration time when a grid imbalance is present via a Limit object 534. The limit can be expressed as a percentage of the maximal value of the acceleration time that the VFD 22 is programmed to provide or in terms of time value. While the user may manually enter any value, other suitable configurations are possible in other embodiments (selecting among a list of pre-defined values, etc.).

2) Modulation—that setting allows the user to determine how the acceleration time will be altered based on the particulars of the grid imbalance via a Modulation object 532. Non-limiting examples of settings include:

a. Linear response—the acceleration time varies linearly with respect to the degree of grid imbalance.

b. Non-linear response—the acceleration time varies non-linearly with respect to the degree of grid imbalance.

c. Binary response—under that setting, the acceleration time either does not change when a grid imbalance occurs (which would be the equivalent of putting the object 530 in the OFF setting) as long as there is a grid imbalance in effect, subject to any limit settings. If a limit setting has been specified, the acceleration time will be reduced to that limit during the entire duration of the grid imbalance event.
   d. Deadband—defines the allowable frequency excursion window outside of which a grid imbalance event is declared. In a variant, the deadband setting can be a global setting, in other words the same deadband definition is used for each controllable parameter of the response of the VFD 22 to a grid imbalance. Objectively, an independent deadband setting for each controllable parameter makes the programming of the VFD 22 more cumbersome, but allows a finer degree of granularity.

Other suitable configurations of the acceleration time region 528 are possible in other embodiments.

Figure 9:
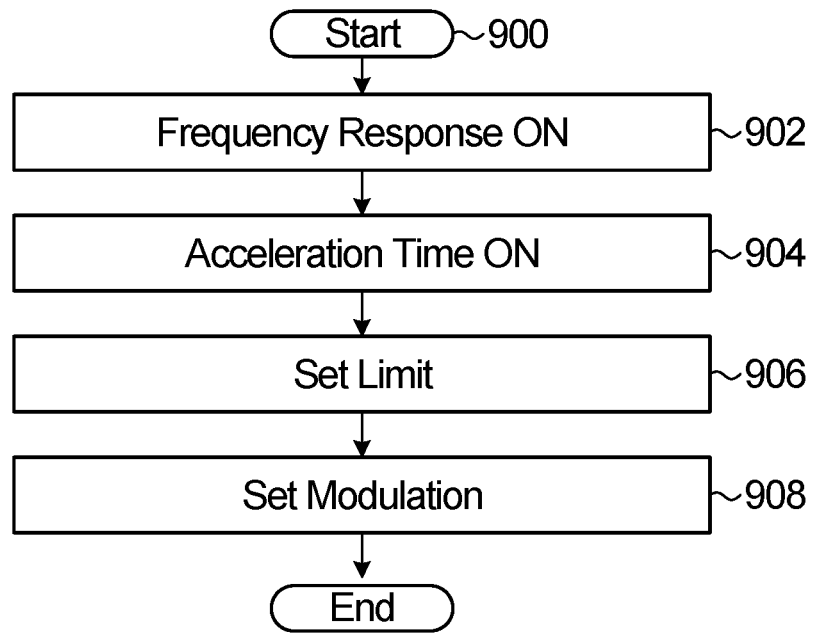
FIG. 9 is a flow chart of a process for entering acceleration time settings in accordance with a non-limiting example of implementation of the disclosure.

With further reference to FIG. 9, a flow chart of a non-limiting process for entering the acceleration time settings is shown. After the VFD 22 is in an active state (generally represented by a "Start" condition at step 900), the user enables the frequency response at step 902 before enabling the acceleration time function at step 904. The user then sets the limit at step 906 and the modulation at step 908.

Acceleration Rate—Ramp Profile

In this non-limiting embodiment, the GUI 500 also has an acceleration ramp profile programmable region 536 to determine if the acceleration time of the VFD 22 will be affected during a response to a grid imbalance event. Using the programmable region 536, the user may specify whether the VFD 22 will modulate an acceleration ramp function of the VFD 22, that is the acceleration rate of the VFD 22, in response to a grid frequency event.

Via an ON/OFF object 538, the user may specify whether the acceleration ramp profile of the VFD 22 is affected by the response to a grid imbalance event. When set to OFF, the VFD 22 will not alter the acceleration ramp profile during the grid imbalance. When set to ON, the VFD 22 will adjust the acceleration ramp profile in response to a grid frequency event according to the specified settings.

When set to the ON position, using the programmable region 536, the user may set the boundaries of an operational window in which the acceleration ramp profile function can vary in response to a grid imbalance event, notably by enabling a different ramp profile than the one the VFD 22 is to use when the network is in a state of balance. Specifically, the settings allow the user to establish limits to such variation. More particularly, the settings include:
   1) Profile—a setting allowing the user to set a ramp profile when a grid imbalance is present via a Profile object 540. In this embodiment, the user is presented with a list of user-selectable ram profiles. The ramp profile can be a linear profile, in other words the motor 25 accelerates at a constant value or it can be a non-linear profile, such as an S-curve, which is characterized by an initial slower acceleration segment to allow a smoother acceleration of the motor 25 and the electrical load 24 that the motor 25 drives, followed by a faster intermediate acceleration segment which is followed a slower acceleration terminal segment. The VFD 22 can be provided with a number of pre-programmed S-curves to choose from that vary from one another in terms of overall slope.
   2) Delta—a setting allowing the user to set a degree of variation of a slope of a linear profile (when the VFD 22 does not respond to a grid frequency event) according to the degree of frequency deviation or of the S-curve of a non-linear profile (when the VFD 22 does not respond to a grid frequency event) according to the degree of frequency deviation via a L slope object 542.
   3) Limit—a setting allowing the user to establish a lower limit to the variation of the slope as described above via a Limit object 534. The limit can be expressed as a percentage of the maximal value of the acceleration time that the VFD 22 is programmed to provide or in terms of time value. While the user may manually enter any value, other suitable configurations are possible in other embodiments (selecting among a list of pre-defined values, etc.).

Other suitable configurations of the acceleration ramp profile region 518 are possible in other embodiments.

Figure 10:
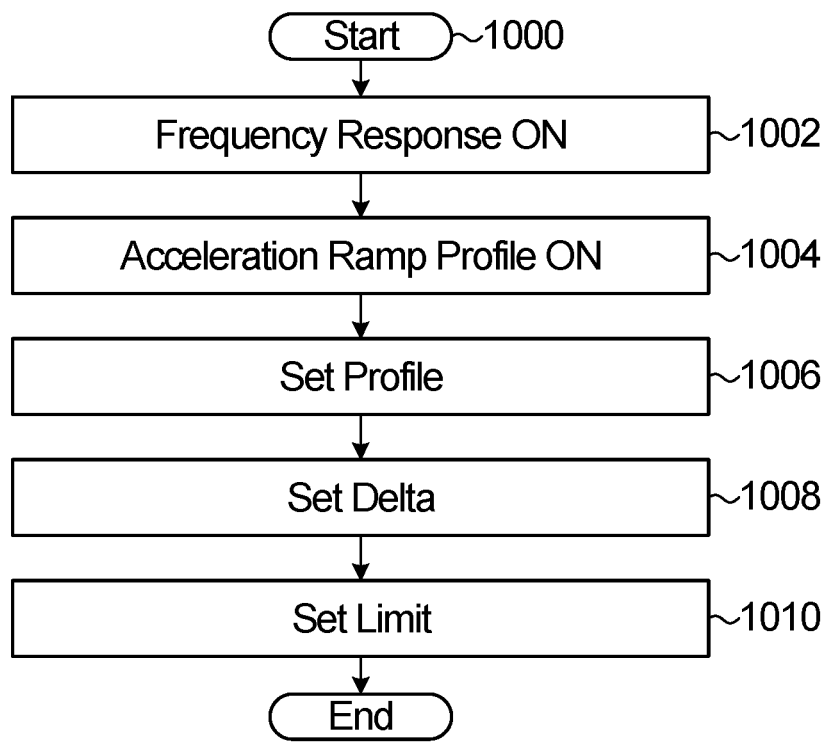
FIG. 10 is a flow chart of a process for entering acceleration ramp profile settings in accordance with a non-limiting example of implementation of the disclosure.

With further reference to FIG. 10, a flow chart of a non-limiting process for entering the acceleration ramp profile settings is shown. After the VFD 22 is in an active state (generally represented by a "Start" condition at step 1000), the user enables the frequency response at step 1002 before enabling the acceleration ramp profile function at step 1004. The user then sets the profile at step 1006, the delta at step 1008 and the limit at step 1010.

Time Modulation

In some non-limiting embodiments, the user may specify via the GUI 500 time information that further modulates the parameters described above. The various settings of the VFD 22 do not have to be static and can be dynamic—in this case they can be modulated based on a particular time of day, week or month. In a non-limiting example, the user may specify via the GUI 500 a time range during the day, during the week and/or during the month over which the response to a grid frequency event as characterized above is enabled or disabled (e.g., where a particular industrial process cannot sustain a variable load consumption). Alternatively, such modulation may also be implemented in response to measurements of certain process parameters via the sensor 317.

Persistence Duration

In this non-limiting embodiment, the GUI 500 also has a persistence duration programmable region 546 to determine if a persistence duration of the VFD 22 will be affected during a response to a grid imbalance event. Using the programmable region 546, the user may specify whether the VFD 22 will modulate the persistence duration of the VFD 22, that is a length of the response period following to a grid frequency event.

Via an ON/OFF object 548, the user may specify whether the persistence duration of the VFD 22 is affected by the response to a grid imbalance event. When set to OFF, the VFD 22 will not alter the persistence duration during the grid imbalance. When set to ON, the VFD 22 will adjust the persistence duration in response to a grid frequency event according to the specified settings.

When set to the ON position, using the programmable region 546, the user may set the boundaries of an operational window in which the persistence duration function can vary in response to a grid imbalance event, notably by enabling a different delay than the one the VFD 22 is to use when the network is in a state of balance. Specifically, the settings allow the user to establish limits to such variation. More particularly, the settings include:
   1) Delay—a setting allowing the user to set a delay (in seconds or minutes) when a grid imbalance is present via a Delay object 550. While the user may manually enter any value, other suitable configurations are possible in other embodiments (selecting among a list of pre-defined values, etc.).
   2) Negative gradient—a setting allowing the user to set a neutral or variable negative gradient.

Other suitable configurations of the persistence duration region 546 are possible in other embodiments.

Figure 11:
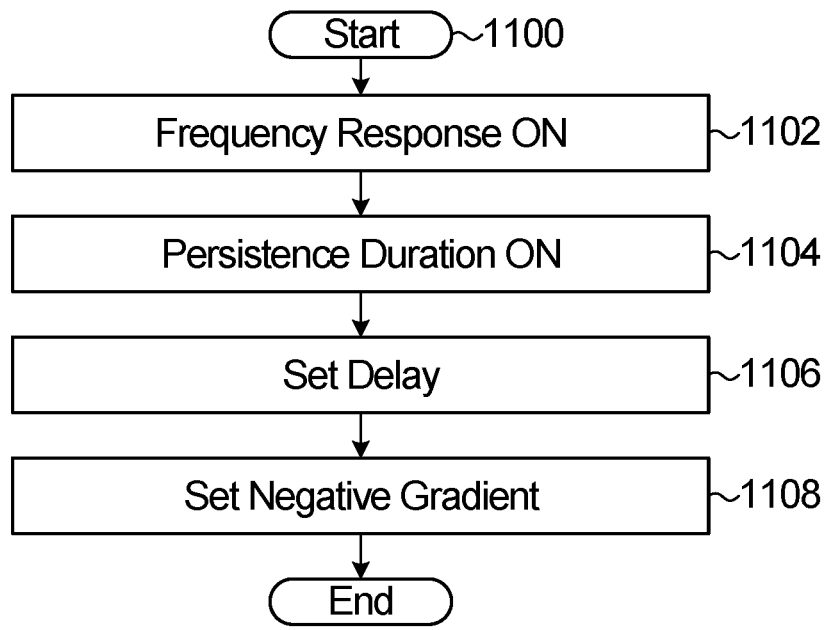
FIG. 11 is a flow chart of a process for entering persistence duration profile settings in accordance with a non-limiting example of implementation of the disclosure.

With further reference to FIG. 11, a flow chart of a non-limiting process for entering the acceleration ramp profile settings is shown. After the VFD 22 is in an active state (generally represented by a "Start" condition at step 1100), the user enables the frequency response at step 1102 before enabling the persistence duration function at step 1104. The user then sets the delay at step 1106 and the negative gradient at step 1110.

While the various settings of the VFD 22 may be manually set by the user via the user interface 315 and the configuration software stored in the memory 390, it is appreciated that specific parameters and/or combination of parameters for the operation of the VFD 22 may also be stored in the memory 390 as user-selectable operation settings/profiles via the user interface 315. The user-selectable operation settings/profiles may be generic or application/process/client specific. In other words, in one non-limiting example, the user may directly select a type of electrical load 24 that is being controlled by the VFD 22. After the user identifies the electrical load 24 being controlled, a set of settings stored in the memory 390 a specifically designed for the particular load is uploaded in the VFD 22.

It is appreciated that the VFD 22 as described above finds applications in the following non-limiting examples of industries: cement, chemical, food and beverage, HVAC, marine and offshore, metals and mining, oil and gas, plastics and rubber, power, pulp and paper, water and wastewater, wind and the likes.

Remote Programming

It is not necessary to program the VFD 22 locally and the VFD 22 may be programmed remotely. In a non-limiting example, when a number of VFDs 22 are present in a network configuration, the central office 26 may implement a more complex configuration software allowing to tailor the response to each VFD 22 individually. In this example, the configuration software is configurable via a GUI at the central office 26 (such as the GUI 500 or any other suitable GUI) and comprising parameters associated with each one of the VFDs 22 present in the network configuration such that the parameters for each one of the VFDs 22 may be individually set. Once the configuration at the central office 26 is completed, the central office 26 communicates with each one of the VFDs 22 to upload the relevant configuration settings via the data communication channels 23.

Figure 12:
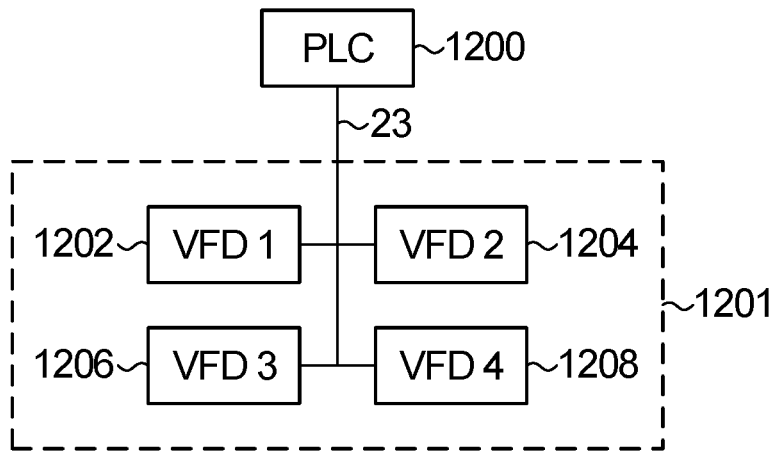
FIG. 12 is a bloc diagram showing a PLC in network communication with four VFDs.

Alternatively, with further reference to FIG. 12, a Programmable Logic Controller (PLC) 1200 may be used to customize the response to a grid imbalance event of a plurality of VFDs 1202, 1204, 1206 and 1208 connected via a network, notably in the context of industrial operations in which a range of electrical loads 24 operate in conjunction in the context of an industrial process 1201 (e.g., pumps, valves, injectors, etc.). The user interface at the level of the PLC 1200 can be used to tailor the overall response to a grid imbalance according to the requirements of the particular industrial process.

In one non-limiting embodiment, the configuration software stored in the memory 390 for execution by the CPU 380 may be implemented directly as part of the PLC 1200. Once the suitable response for each one of the VFDs 1202, 1204, 1206 and 1208 has been remotely programmed at the level of the PLC 1200, it can be uploaded by the PLC 1200 to respective one of the VFDs 1202, 1204, 1206 and 1208 via the data communication line 23. It is appreciated that, using this strategy, it may be possible to change the electrical consumption of some VFDs 1202, 1204, 1206 and 1208 but not others based on which VFD may be more critical in the context of the industrial process 1201. In this configuration, the response is still reliant on local sensing of the frequency by each one of the VFDs 1202, 1204, 1206 and 1208, therefore no communication between the PLC 1200 and the VFDs 1202, 1204, 1206 and 1208 is needed after the resulting settings have been uploaded to each one of the VFDs 1202, 1204, 1206 and 1208 to implement the response strategy since each one of the VFDs 1202, 1204, 1206 and 1208 can independently implement such response.

Figure 13:
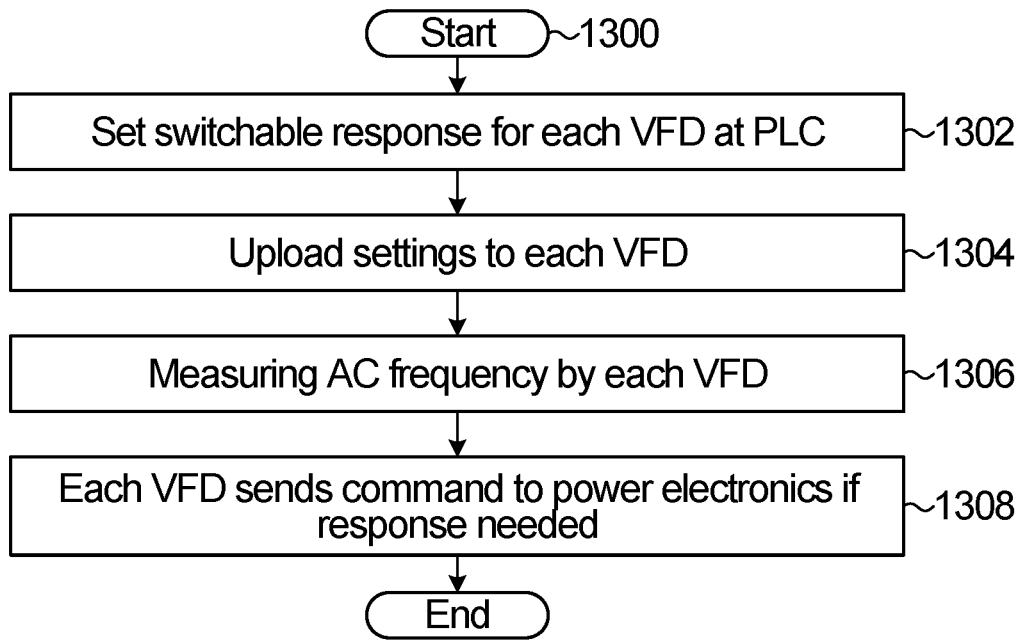
FIG. 13: is a flow chart of a frequency response process with a programmable logic controller (PLC) in accordance with a non-limiting example of implementation of the disclosure.

With further reference to FIG. 13, a flow chart of a non-limiting frequency response process is shown. After the VFDs 1202, 1204, 1206, 1208 and the PLC 1200 are in an active state (generally represented by a "Start" condition at step 1100), the response for each one of the VFDs 1202, 1204, 1206, 1208 is programmed at the PLC 1200 at step 1302. The response settings are uploaded to respective VFDs 1202, 1204, 1206, 1208 at step 1304. Each one of the VFDs 1202, 1204, 1206, 1208 measures the AC frequency at step 1306 and then send command to power electronics if needed at step 1308.

In another non-limiting embodiment, the programming may be dynamic in the sense that the PLC 1200 is directly equipped with a card that measures the frequency of the AC input, as described previously, in some cases the unfiltered AC input, such that a determination is made by the PLC 1200 as to whether a frequency event is occurring. When a frequency event is detected by the PLC 1200, the PLC 1200 then sends various commands over the network to each one of the VFDs 1202, 1204, 1206 and 1208 for implementation in order to directly alter the operation of relevant one of the electrical load 24 and achieve the desired response to the frequency event. Alternatively, the PLC 1200 may be configured to sense (or receive from a remote location such as the central office 26) an indication of the occurrence and a characterization of a grid imbalance and communicate that information to the VFDs, such that they can autonomously respond.

Figure 14:
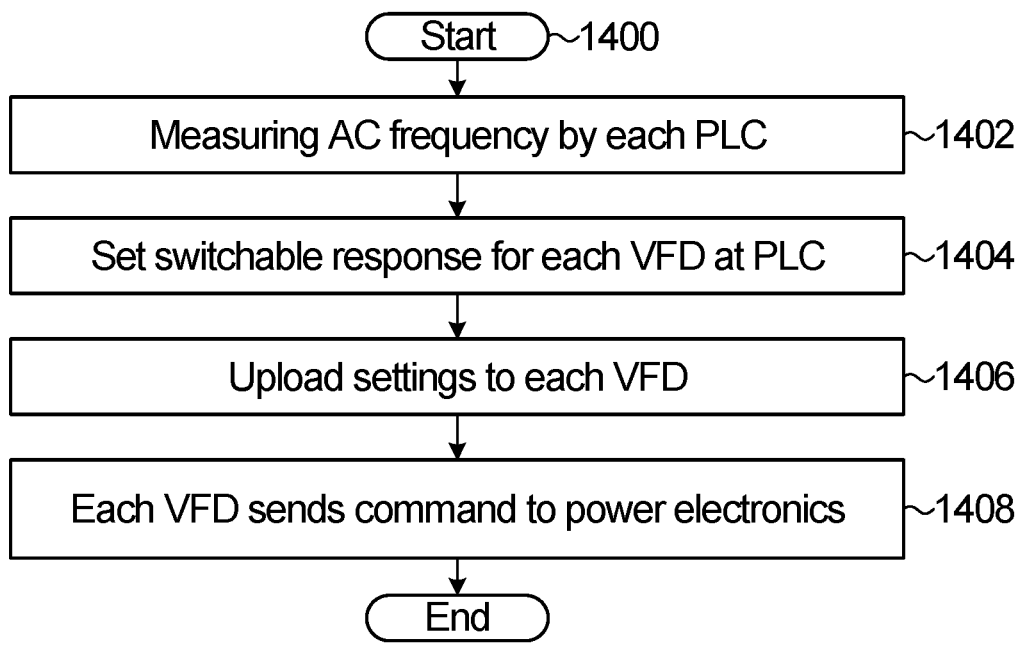
FIG. 14: is a flow chart of a frequency response process with a PLC in accordance with another non-limiting example of implementation of the disclosure.

With further reference to FIG. 14, a flow chart of another non-limiting frequency response process is shown. After the VFDs 1202, 1204, 1206, 1208 and the PLC 1200 are in an active state (generally represented by a "Start" condition at step 1400), the PLC 1200 measures the AC frequency at step 1402. The response for each one of the VFDs 1202, 1204, 1206, 1208 is then programmed at the PLC 1200 at step 1302. The response settings are uploaded to respective VFDs 1202, 1204, 1206, 1208 at step 1406 and each one of the VFDs 1202, 1204, 1206, 1208 sends command to power electronics if needed at step 1408.

Any suitable industrial process comprising a plurality of VFDs 22 may be controlled by the PLC 1200 described above. In the context of a multi-load environment application, in particular one where a central control entity manages the operation of a plurality of electrical loads 24 in order to provide a coordinated physical effect, that central entity may be responsible to implement the response to a grid imbalance such as to reduce the electrical consumption while maintaining the coordination between the various electrical loads 24. An example of such application is a Computer Numerical Control (CNC) machine, either for machining, welding, or a combination of both. In that example, the CNC machine executes a motion control software, which regulates the movement of the various axes according to preset tool or welding path. For instance, a CNC milling machine would usually have three independently movable axes, such as X and Y axes that are horizontal axes and a vertical Z axis. In addition, the machine would also have a spindle that carries the machining tool. The motion of all the axes including the spindle is coordinated in order to displace the tool over a predetermined tool path with relation to the workpiece at a certain rate, typically referred to as "federate" that is selected to achieve an optimal rate of material removal and surface finish. When desired to reduce the electrical consumption of the milling machine, it is not required to control each motion controller driving a respective axis and the spindle separately—it is sufficient to simply lower the feed rate and let the motion control software handle the coordination between the various motion controllers to achieve a slower but coordinated movement. In the event the CNC machine uses a larger number of motion axes, the same principle would apply. During a grid imbalance, the machine will simply slow down in order to reduce its electrical consumption, but it will not crash or produce a defective part. A CNC lathe would function similarly.

Another example of a CNC machine is a robotic arm, which again uses a series of independent drives to achieve a coordinated movement. In that example, the parameters that can be adjusted to regulate the electrical consumption of the robotic arm are the speed of movement and/or the acceleration. Accordingly, by programming the robotic arm to lower its speed and/or acceleration in the event of a grid imbalance, the electrical consumption is lowered but the overall motion coordination is retained.

Other industrial processes and/or systems are well suited for the regulation strategy described above, such as but not limited to metallurgic processing, cooling systems (e.g., HVDC cooling systems, SVC cooling systems, metallurgic process cooling, drives, rectifiers and converters cooling, research/medical applications cooling, non-electrical environment cooling, data center cooling, etc.) and the likes.

Accounting

After the local response has been implemented in response to a grid frequency event as described above, the VFD 22 notifies the central office 26 of the event via the data communication line 23. To this end, the VFD 22 generates information (or post-event information when a frequency deviation event has occurred) that can be saved as a historical pattern within the memory 390 of the VFD 22. The VFD 22 can also communicate the information directly to the central office 26 which collects the information in a log and associates such information to the particular VFD 22 of the network that communicated the information to the central office 26. At the grid-wide level, the information communicated enables the central office 26 to compute an aggregate response provided by a plurality of VFDs 22 on the network and assess the performance of the plurality of VFDs 22 and their impact on the grid 20 stability in a number of ways.

In one non-limiting embodiment, the information communicated to the central office 26 relates to the adjustment of the electrical consumption of the particular electrical load 24 (i.e., an accounting operation). That aspect is useful when some form of compensation of the user of electricity is contemplated for accepting to reduce the electrical consumption of the load in order to stabilize the grid during the occurrence of a grid imbalance. Specifically, the information may notably comprise a duration and a reduction in the electrical consumption of the motor 25 in response to the grid frequency event (e.g., the power generation deficit). Because the information communicated to the central office 26 is generally representative of a contribution of the VFD 22 to the electric power grid 20, and the aggregate contribution of the plurality of VFDs 22, the central office 26 can then use the information communicated as a basis to establish a compensation by the utility company operating the electric power grid 20, either monetary or in some other form.

The information may be computed using a mathematical model or may be measured directly by the VFD 22. If the electrical consumption of the particular electrical load 24 has been reduced in response to a power generation deficit, the accounting operation shows the extent to which the operation of the electrical load 24 has been curtailed. The accounting operation is conducted on the basis of the user-editable settings of the VFD 22, as described above, that determine the response to a grid imbalance event. More specifically, the accounting operation looks at each individual programmable setting to determine how that particular setting has affected the consumption of the electrical load 24; in other words it computes what the consumption would have been if there would have been no grid imbalance.

The mathematical model works best for applications where the electrical consumption varies according to the demands of the electrical load 24 and it is not stable over time. That can be the case of an electrical motor that has a variable speed, which changes according to an industrial process requirement that is independent of the grid imbalance. Since the electrical consumption of the electrical load 24 will naturally fluctuate over time, the PLC 1200 or the VFD 22 can measure the actual consumption during a grid imbalance event as a baseline and compute based on the mathematical model representative of the consumption reduction, defined by the parameters of the response, what the consumption would have been if there would have been no grid imbalance.

A direct measurement is useful for applications where the consumption of the electrical load 24 is stable over time and it provides a known baseline. Accordingly, by measuring directly the actual consumption of the electrical load 24 resulting from a response to a grid imbalance event, it is possible to compute how much the consumption of the electrical load 24 was curtailed during the grid imbalance.

Each power control device (e.g., VFD 22) can perform the accounting function individually. Alternatively, the accounting function can be performed globally by the PLC 1200 over the entire population of the power control devices it manages. In the former case, once the power control device completes the accounting function, it forwards the results to the PLC 1100, which combines the results with those sent by other power control devices such as to provide a global result.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for the purpose of describing, but not limiting, the present disclosure. Various modifications and enhancements will become apparent to those of ordinary skill in the art and are within the scope of the present disclosure.

The invention claimed is:

1. A variable frequency drive for driving an AC electric motor, the variable frequency drive comprising:

a. a power input to receive an AC waveform from an AC power grid;
b. power electronics for outputting a variable frequency output for driving the AC electric motor;
c. a control module, configured for:
  i. sensing a characteristic of the AC waveform to assess a state of equilibrium between a power generation side and load side of the power grid;
  ii. in the event the control module assesses a presence of an imbalance produced by a power generation deficit, sending a control signal to the power electronics to alter a characteristic of the variable frequency output to reduce an electrical consumption of the AC electric motor,
wherein the characteristic of the variable frequency output includes AC electric motor start-up current level.

2. The variable frequency drive as defined in claim 1, wherein the control module is configured to modulate a parameter of the variable frequency output according to a magnitude of the imbalance.

3. The variable frequency drive as defined in claim 1, wherein the characteristic of the AC waveform is a frequency of the AC waveform.

4. The variable frequency drive as defined in claim 1, wherein the characteristic of the variable frequency output further includes voltage or torque boosting.

5. The variable frequency drive as defined in claim 1, wherein the characteristic of the variable frequency output further includes AC electric motor speed.

6. The variable frequency drive as defined in claim 1, wherein the characteristic of the variable frequency output further includes a frequency of the variable frequency output.

7. The variable frequency drive as defined in claim 1, wherein the characteristic of the variable frequency output further includes AC electric motor acceleration time.

8. The variable frequency drive as defined in claim 1, wherein the characteristic of the variable frequency output further includes AC motor acceleration ramp profile.

9. The variable frequency drive as defined in claim 1, wherein the power electronics includes an inverter.

10. The variable frequency drive as defined in claim 9, wherein the inverter outputs the variable frequency output.

* * * * *